United States Patent [19]

Krohe

[11] 4,127,108

[45] Nov. 28, 1978

[54] BAKING APPLIANCE ADAPTED TO BE HEATED IN THE OVEN OF A COOKER

[75] Inventor: Alfred Krohe, Gräfelfing, Fed. Rep. of Germany

[73] Assignee: Firma Carnovia Verrebanstall FL, Vaduz, Liechtenstein

[21] Appl. No.: 785,241

[22] Filed: Apr. 6, 1977

[51] Int. Cl.² .................. A47J 27/04; A47J 27/10
[52] U.S. Cl. .................. 126/369; 99/426; 220/354; 220/366; 220/367
[58] Field of Search .......... 99/426, 439, 445, 345–347; 220/354, 366, 367, 206, 205; 249/55, 141; 126/274, 275 R, 19 M, 369

[56] References Cited

U.S. PATENT DOCUMENTS

| 681,502 | 8/1901 | Heyne | 99/345 |
|---|---|---|---|
| 1,712,242 | 5/1929 | Zimmerman | 99/346 |
| 1,977,486 | 10/1934 | Louis | 99/346 |
| 2,072,036 | 2/1937 | Horsman | 126/275 R |
| 3,659,585 | 5/1972 | Bay | 126/390 |

FOREIGN PATENT DOCUMENTS 3,705 of 1902 United Kingdom .......... 99/345

*Primary Examiner*—Harvey C. Hornsby
*Assistant Examiner*—Timothy F. Simone
*Attorney, Agent, or Firm*—Jacob L. Kollin

[57] ABSTRACT

The specification describes a baking appliance adapted to be placed in the baking oven of a cooker for receiving material to be baked. It comprises a bottom plate, a hood mounted on it with an open end and a lid closing the open end for baking rye flour bread and other forms of bread. The appliance consists of refractory stoneware for example fireclay. The bottom plate has a peripheral groove for having the hood fitted in it. In the top of the hood there is an air discharge opening and on the lid there is a closable opening for the supply of air and water.

1 Claim, 8 Drawing Figures

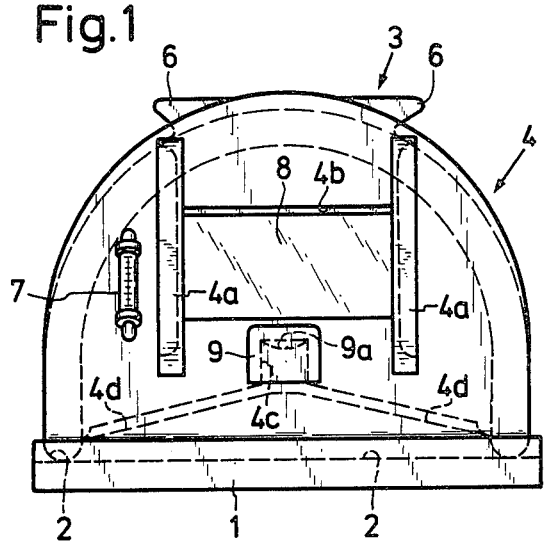
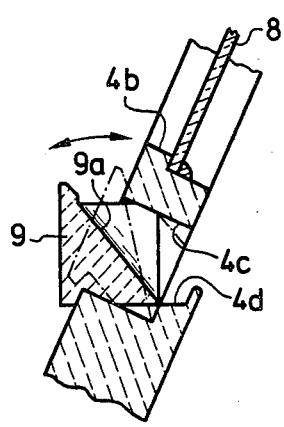
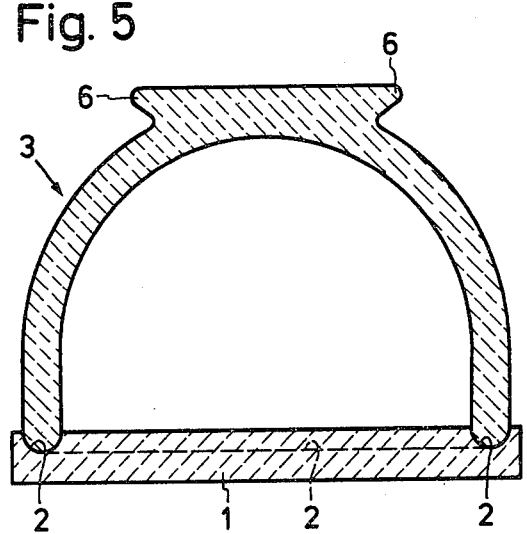

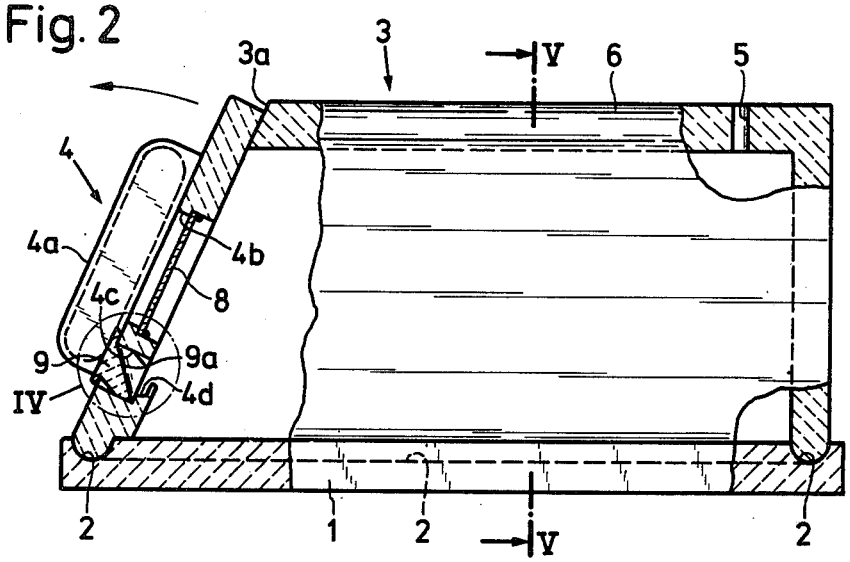
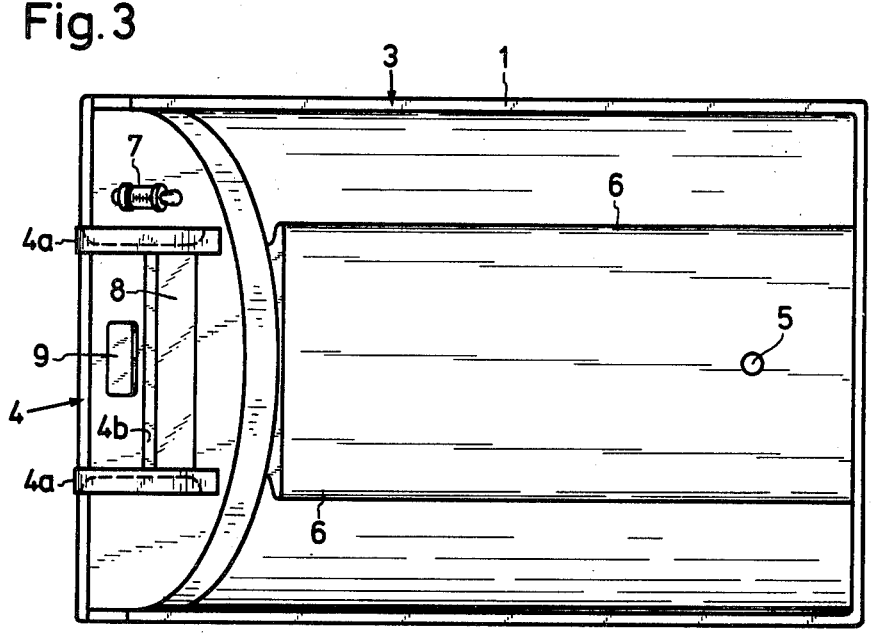

BAKING APPLIANCE ADAPTED TO BE HEATED IN THE OVEN OF A COOKER

A baking appliance adapted to be placed in the oven of a cooker and made of sheet metal has already been proposed for holding the food to be baked. The device comprised a bottom plate, a hood arranged to be placed on the bottom plate and having an open end, and a lid adapted to close the open end. This baking appliance was not suitable for baking bread with a rye flour in it, because for baking such bread it is necessary for the oven to store heat and for the temperature to drop gradually. This is not possible in a cooker oven with a sheet metal lining.

One aim of the invention is that of creating a baking device which makes it possible for everyone to bake bread comprising or consisting of rye flour.

For this purpose the invention proposes a baking device, which can be mounted in the oven of a cooker more particularly for baking bread containing rye flour and which is characterised in that in accordance with the invention it consists of refractory stoneware as for example fireclay, in that the bottom plate has a peripheral groove for the hood to fit into and in that at the top of the hood there is an air outlet opening and on the lid there is an opening, which can be closed, for the supply of air and water.

Furthermore the lid has, in accordance with the invention, an inspection window and a thermometer so that the baking process can be checked as it takes place.

In accordance with a further proposal of the invention in the ventilation and water supply opening there is a closing plug, adapted to be tilted, which makes it easily possible to clear the opening.

Furthermore in accordance with the invention the closure lid is provided with a draining groove, which opens into a trough running downwards on both sides of the lid.

It is advantageous in accordance with the invention if the open end of the hood is made slighty oblique so that the lid is held in position by gravity.

Finally in accordance with another proposal of the invention the hood is made polygonal in cross-section and at the two ends is made slightly oblique, the lids lying against these ends.

In the drawing the baking appliance is shown diagrammatically and by way of example.

FIG. 1 shows a front view with a plan view of the lid.

FIG. 2 shows a device in elevation and partly in section.

FIG. 3 is a plan view.

FIG. 4 is an enlarged representation of the part IV in accordance with FIG. 2.

FIG. 5 shows a section taken in the plane V—V of FIG. 2.

Figure 6:
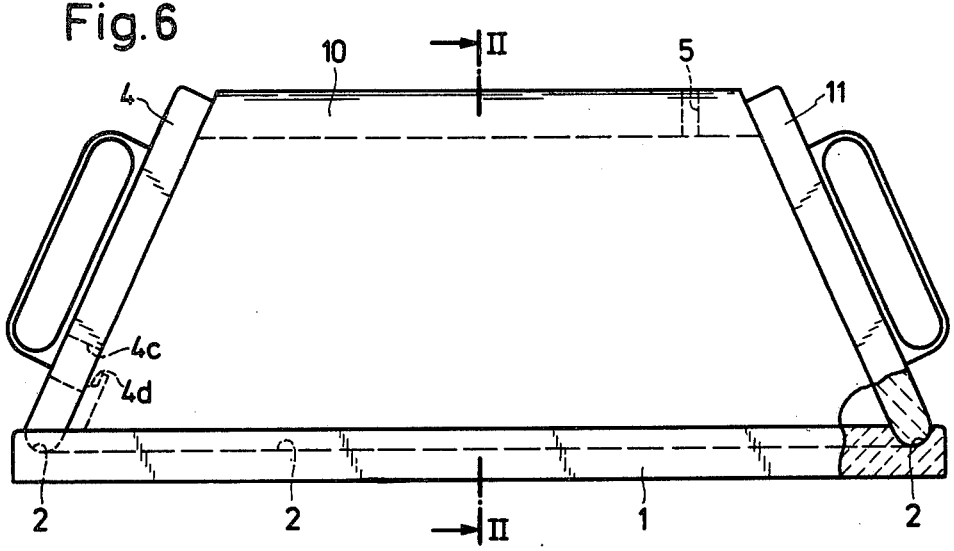
FIG. 6 shows a side view of another embodiment.

In accordance with FIGS. 1 to 5 a peripheral groove 2 is provided in the bottom plate 1. Into this groove there fits a hood 3, provided with an open end, and a lid 4. The hood has at the top an air outlet opening 5 and a handle 6 with a horizontal surface so that there is not only the possibility of lifting the hood and placing it in position, but also a possibility of standing it as desired.

The open end 3a of the hood is made slightly oblique. The lid possesses two handles 4a, a thermometer 7, a section 4b with an inspection window 8 and at the bottom an opening 4c, which serves both as an air passage and also as a means for supplying water. This opening can be closed by a tilting plug 9, which has a groove 9a for the water to be placed in the device during the process of baking. The groove 9a opens into a trough 4d of the lid which runs downwards on both sides.

Figure 7:
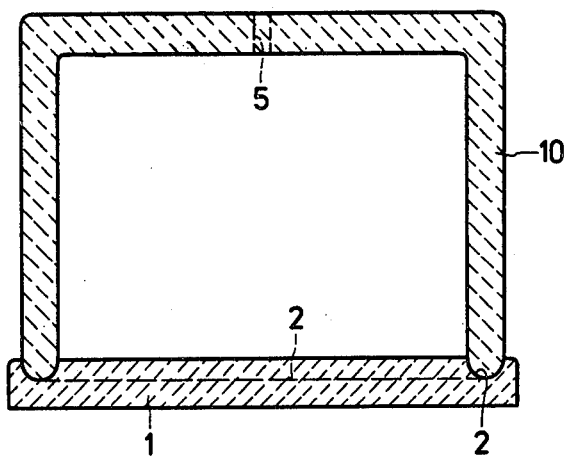
FIG. 7 shows a section in plane A—A.
Figure 8:
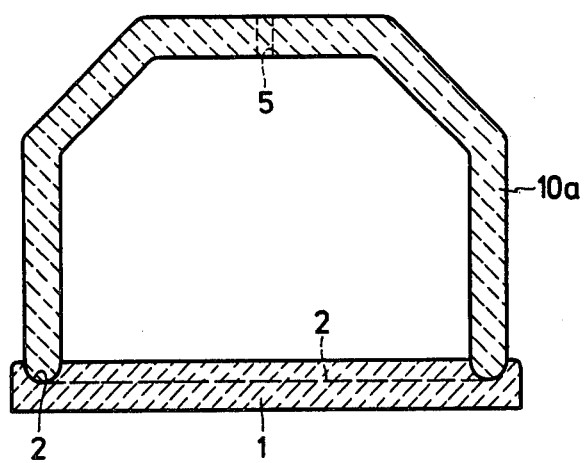
FIG. 8 shows a different form of the cross-section of the hood.

In FIGS. 6 to 8 another form of the hood is shown. In accordance with this form the hood 10 — as shown for example in FIGS. 7 and 8 — is polygonal in cross-section and the ends are made slightly oblique. The open ends of the hood are closed by the lids 4 and 11. This form of the hood has been found to be particularly advantageous in production, since it makes possible production by extrusion.

For baking the baking appliance is placed for example in a cooker oven at a temperature of 280° C., so that the appliance stores heat which after approximately 75 minutes will drop to approximately 180° C. Naturally the bread dough is only placed in the baking appliance when it has been heated up to the required extent.

The embodiments of the invention in which an exclusive property of privilege are as follows:

1. A baking appliance adapted for baking in an oven, comprising a flat rectangular base of refractory fire clay having a lower face and an upper face, said upper face being formed with a peripheral groove, a hood of refractory fire clay having a lower rim adapted to fit into said peripheral groove, said hood extending upward of said base and forming a bread receiving and baking chamber, said hood having a pair of end walls and a pair of side walls, one of said walls being slanted and having an opening therein, a lid for closing said opening, said slanted wall having a lower end portion provided with a closable opening for introduction of water and air into said appliance and an inspection window, said closable opening is a tilting closing plug having a drainage groove, said drainage groove opens into a trough within said baking chamber which extends downwards on both sides of said closable opening.

* * * * *